Patented Nov. 20, 1928.

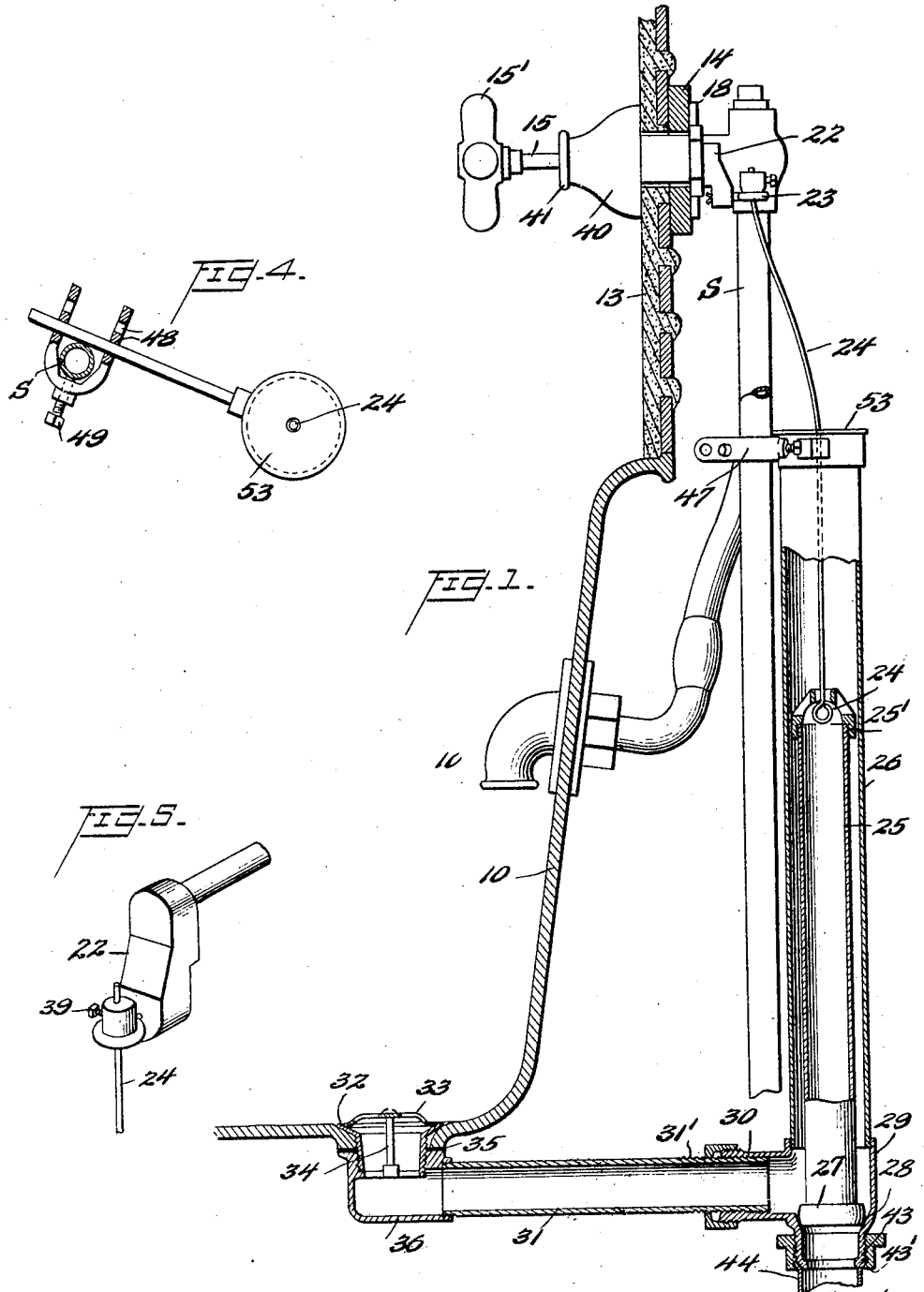

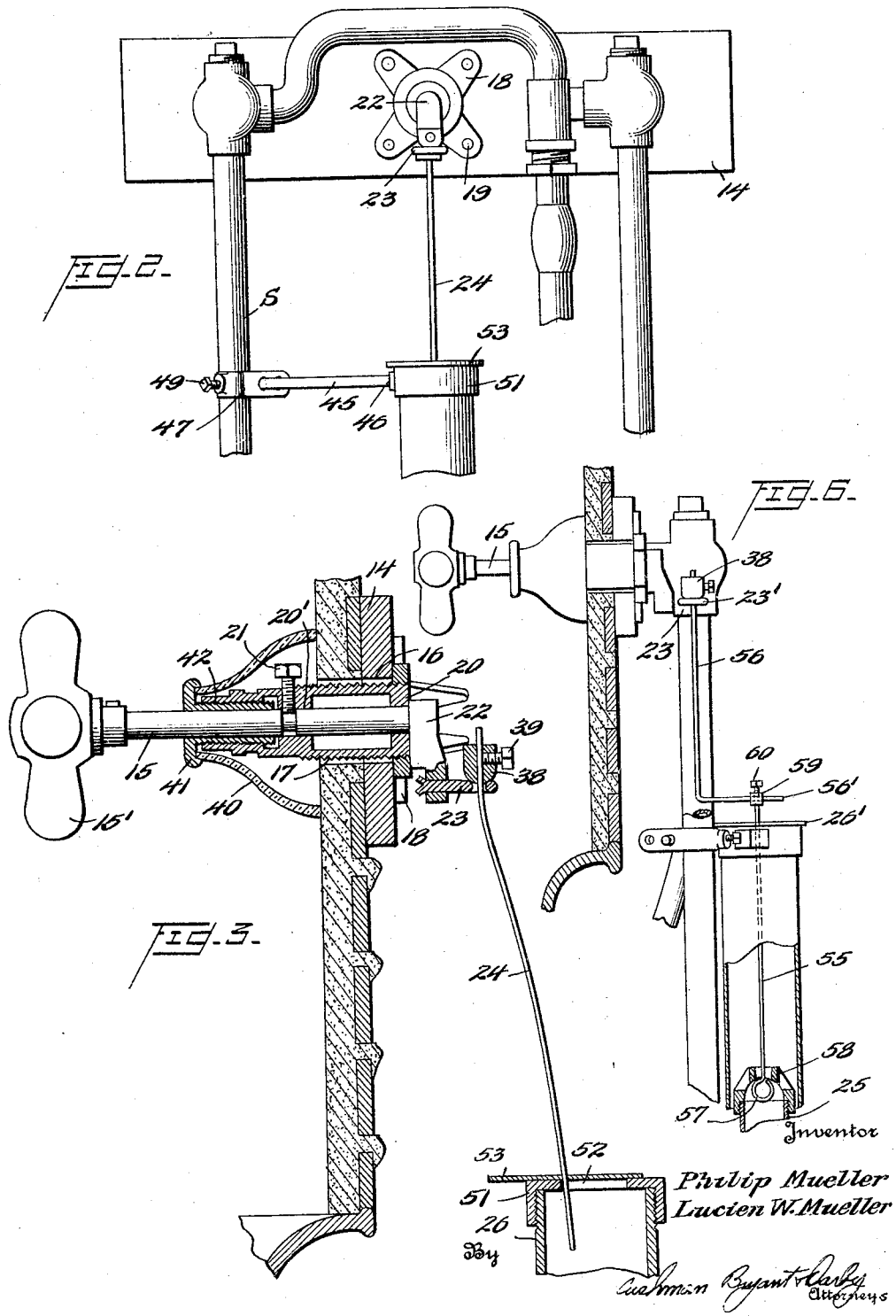

1,692,512

UNITED STATES PATENT OFFICE.

PHILIP MUELLER AND LUCIEN W. MUELLER, OF DECATUR, ILLINOIS, ASSIGNORS TO ADOLPH MUELLER, TRUSTEE, OF DECATUR, ILLINOIS.

WASTE-CONTROL MECHANISM.

Application filed December 22, 1926. Serial No. 156,376.

The present invention relates to plumbing fixtures, and more particularly to mechanism for controlling the waste or drainage from tubs and similar receptacles.

An object of the invention is to provide a waste control mechanism which may be readily installed after the service pipes have been roughed in and the tub placed in position by reason of the fact that it is adaptable to various positions of the supply pipes and the tub, and comprises a relatively small number of readily adjustable parts.

A further object of the invention is to provide a mechanism which is simple in construction, positive in its operation, and which may be manufactured at a reasonable cost. More detailed objects of the invention have to do with the mounting of the stand pipe for the waste valve, the means for supporting the same, and the mechanism for operating the valve.

These and other features and objects of the invention will become clearer as the description proceeds in connection with a preferred embodiment shown in the accompanying drawings, wherein:

Figure 1 is a vertical sectional view showing the mechanism installed.

Figure 2 is a rear elevational view showing more particularly the bracing means for the upper end of the stand pipe and the operating means for the valve.

Figure 3 is a fragmentary vertical sectional view showing the valve operating mechanism in detail.

Figure 4 is a fragmentary top plan showing the bracing means for the upper end of the stand pipe.

Figure 5 is a perspective of the connection between the valve and the operation rod, and Figure 6 is a fragmentary view of a modified construction.

Referring to the drawings, 10 indicates a tub having the usual water inlet spout 11, and at its upper end 12 joining a wall 13, at the rear of which is mounted a carrying plate 14, which may be of wood, metal or other suitable material, and carries in a number of openings registering with openings in the wall, the control valves for the supply pipes and a shaft 15 which extends through an opening 16 in the plate. The shaft 15 is positioned within a bushing 17, which is externally threaded to fit within a spider 18 secured to the plate 14, as by means of fastening screws or pins 19. The bushing has bearings 20, 20' for the shaft, and into the latter bearing extends a screw 21 to engage a circumferential groove in the shaft to prevent longitudinal movement of the latter when it is fitted within the bushing.

Behind the wall and plate, the shaft carries an arm 22 having at its outer end a pin 23 which is rotatably mounted in the arm and is formed with an eye 23' to receive a flexible or semi-flexible connecting member such as wire 24 extending downwardly to a tube valve 25 within the stand pipe 26. The pin 23 is mounted for rotation in the arm 22 so that irrespective of the position of the arm, the outer end of the pin will remain horizontal, thus preventing bending of the flexible connecting wire at the pin.

The tube 25 is vertically movable within the stand pipe 26, and carries at its lower end a washer or valve member 27 adapted to cooperate with a seat 28 positioned within a T-fitting 29, having a lateral extension 30 making a threaded connection with a branch pipe 31 leading to the drain opening 32 of the tub. In the latter opening is positioned the strainer plate 33 connected by means of a screw 34 to a strainer member 35 extending downwardly and threaded into an elbow fitting 36 at the end of the branch pipe 31.

The construction above generally described is broadly old, but here embodies a number of features enabling the entire waste mechanism to be readily adapted to various positions of the tub and mounting plate 14. These improvements have to do (1) with the operating connection between the valve and operating shaft; (2) the connection between the stand pipe 26 and the drain opening 32 of the tub; and (3) the means for bracing and fixedly securing in position the stand pipe 26.

The rotatable crank pin 23 on the operating shaft receives a semi-flexible connecting member, such as the wire 24, the latter extending downwardly and provided with a head 24' connecting it loosely to the upper end of the tube 25 by means of a cap member 25' threaded on the upper end of the tube. The connecting wire extends freely through the opening in the pin 23 and carries a knob or boss 38, which may be held in any selected position on the wire by means of a set screw 39 and has a ball-like or curved under-surface to permit it to rock freely in the eye at the outer end of arm 23. Obviously, by adjusting the knob 38 longitudinally of the wire, the connection is accommodated to any vertical position of the plate 14 or stand pipe 26. Since the knob 38 is free to rock in its seat formed by the eye 23' and pin 23, the wire connecting member will not bend and furthermore, the connection is thereby adapted to various positions of the stand pipe laterally with respect to the vertical plane extending through the axis of the operating shaft.

As will be understood, the stand pipe and plate 14 may be moved together or apart, and when this is done, the connection may be extended or shortened, as may be desired. When installing the mechanism, it will be understood that the plate 14 is positioned behind the wall with the spider 18 and bushing 16 therein. The operating shaft 15 may then be inserted by means of the set screw 21, the handle 15' being removable for this purpose, so that the shaft may be freely inserted from behind the wall. The construction may be finished off by means of an escutcheon 40, which is held in position by a clamping cap 41 having a threaded shank 42 fitting into the end of the bushing 16.

From the foregoing, it will be apparent that the connection which comprises the flexible or semi-flexible wire 24, the rotatable pin 23 and the crank arm 22, permits setting up of the stand pipe in various positions relative to the axis of the operating shaft 15. It is possible to arrange the stand pipe not only in various positions paralleling the vertical plane extending through the shaft 15 or in that plane, but also in various positions laterally with respect to said plane. In other words, the stand pipe may be disposed in different radii with respect to the axis of the shaft 15, and also because of the fact that the connection may be extended by adjusting the knob 38 along wire 24, the distance of the stand pipe toward and from the shaft 15 in said radii may be varied. The top of the stand pipe is closed by means of a cap 26' which rests loosely thereon so that it may slide laterally to adapt itself to any angular or lateral movement of the wire or rod 24 which may move in this manner, not only because it is flexible, but also because of its loose connection at 24' with the valve 25 and through the knob 38 with the crank arm on the operating shaft 14.

Referring now to the connection between the stand pipe 26 and the tub drain opening 32, it will be noted that the branch pipe 31 has one end threaded at 31' for a substantial distance and fitted within the lateral extension 30 of the T-coupling 29. Obviously, the branch pipe 31 may be moved into and out of the extension 30 for a substantial distance, and, hence, is readily adapted to various positions of the tub with respect to the stand pipe. Moreover, it may be adjusted laterally simply by turning the entire stand pipe with the coupling 29. This adjustment is possible, for the reason that the connection at the lower end of the coupling 29 is in the form of a collar 43 having a flange 43' adapted to engage the flange of a drain pipe 44 and clamp the same to the fitting 29, on which the collar 43 is threaded. It is evident, therefore, that the stand pipe may be rotated freely, to move the branch 31 laterally, and also that the latter may be adjusted longitudinally to accommodate the construction to any position of the tub within a reasonable range.

The third feature of the invention has to do with the means for supporting the stand pipe 26 rigidly in position. At its lower end, the connection with the drain pipe 44 and the tub serves to retain it against movement and to cooperate with the connections at the lower end of the stand pipe. There is provided a bracing means at its upper end which is also readily adjustable, so that it is adaptable for use in practically any position the stand pipe may be set up. This means, in the present instance, comprises a rod 45 secured at one end 46 to the stand pipe and extending laterally therefrom. A yoke member 47 is adapted to be positioned upon a service pipe S or other rigid support, and to receive in any one of a plurality of pairs of openings 48, which are spaced longitudinally of its arms, the end of the rod 45. Obviously, the yoke may be adjusted longitudinally of the rod to permit the stand pipe to be arranged suitably with respect to the rigid support, and by positioning the rod in the desired pair of openings 48, the connecting means may be adapted to service pipes or supports of different dimensions. A set screw 49 extends through the yoke and abuts the pipe S', thus serving as a common means for securing the yoke on the pipe and fastening together the rod 45 and the yoke.

This bracing means, the construction of which may evidently be varied considerably, is one which is extremely simple in construction and very useful by reason of its ready adjustability, which makes it adaptable to practically any position of the stand pipe. The entire bracing means may be installed after the stand pipe is set up, by reason of the fact that the rod 45 is not directly secured to the pipe, but engages a collar 51 detachably threaded on the upper end of the same (Figure 3). It will be noted that the top of the collar is provided with a relatively large opening 52, over which is positioned the freely and laterally slidable cap 21' surrounding the flexible connection 24 between the valve and operating shaft 15. This arrangement permits the flexible connecting rod to move laterally during operation or adjustment of the parts, and the cap 52, although moving with the connecting wire, will maintain the opening 52 closed, since it is of considerably greater diameter than the opening.

Referring to Figure 6, there is shown a modified construction for the purpose of illustrating a variation in the connection between the operating shaft 15 and the valve 25. Instead of employing a flexible wire element such as is illustrated in the other views, there is here shown a connection which comprises two sections 55, 56, the former having a loose pivotal connection 57 to the cap member 58 on the valve 25. At its upper end, the connecting element 55 carries an eye 59 through which extends the horizontal arm 56′ of the connecting element 56 and a set screw 60 serves to clamp the eye 59 and horizontal arm 56′, together. The element 56 extends at its upper end through the eye 23′ of the freely rotatable pin 23, and the knob 38, which is adjustable to element 56, provides an extensible connection.

The connecting elements 55 and 56 need not be individually flexible due to the connection between these elements. As will be understood, by loosening the set screw 60, it is possible to adjust the element 55 longitudinally of horizontal arm 62′, and thus the stand pipe may be moved to a number of positions in a plane paralleling the vertical plane extending through the operating shaft 15. Moreover, due to the pivotal connection 57 and the fact that the eye 59 may be moved pivotally about the arm 56′, the stand pipe may be set up in various positions laterally disposed with respect to the vertical plane extending through operating shaft 15. Although the element 55 is not itself flexible, but may be, if desired, it is adapted to be arranged angularly with respect to the axis of the stand pipe and when disposed in such an angular position, it will not bind in its vertical movements due to the fact that the cap 26′ is freely slidable above the stand pipe. Although the extent to which the stand pipe may be set up laterally with respect to the vertical portion of the element 56 is more limited than with a construction embodying a flexible element such as the wire 24, it will be understood that this connection is, in a broad sense, a flexible one because of its sectional construction.

It is evident that numerous changes may be made in the construction described without departing from the invention, which is defined in the following claims.

We claim:

1. In a waste control, a stand pipe having a gravitative valve and a valve seat therein, a branch pipe adapted to conduct waste thereto from a tub or the like and operating means for said valve comprising a manually rotatable shaft, an arm carried by said shaft, a pin on said arm extending in substantially the direction of the shaft, and a continuous, integral wire-form element freely bendable and forming a connection between said pin and valve adapted to permit positioning of said stand pipe on various radii with respect to the axis of said shaft, said element having a loose connection directly with said pin at one end thereof and with the valve at the other end thereof.

2. In a waste control, a stand pipe having a gravitative valve and a valve seat therein, a branch pipe adapted to conduct waste thereto from a tub or the like and operating means for said valve comprising a manually rotatable shaft, an arm carried by said shaft, a pin on said arm extending in substantially the direction of the shaft, and a flexible connection between said pin and valve comprising an unjointed wire-form element freely bendable to permit positioning of said stand pipe on various radii with respect to the axis of said shaft and at varying distances from the axis of said shaft of said radii, said wire-form element having a loose connection directly with said pin at one end thereof and with the valve at the other end thereof.

3. In a waste control, a stand pipe having a gravitative valve and a valve seat therein, a branch pipe adapted to conduct waste thereto from a tub or the like and operating means for said valve comprising a manually rotatable shaft, an arm carried by said shaft, a pin on said arm extending in substantially the direction of the shaft, and a continuous unjointed wire-form element forming a flexible extensible connection between said pin and valve adapted to permit positioning of said stand pipe on various radii with respect to the axis of said shaft and at various distances on said radii from said shaft, said element being loosely connected at one end directly with said valve and loosely connected at the other end with said pin and being bendable whereby to be adapted to various positions of the stand pipe relative to said operating means.

4. In a waste control, a stand pipe having a gravitative valve and a valve seat therein, a branch pipe adapted to conduct waste thereto from a tub or the like and operating means for said valve comprising a manually rotatable shaft, an arm carried by said shaft, a pin on said arm extending in substantially the direction of the shaft, and freely rotatable on an axis paralleling that of the shaft, and a flexible extensible connection between said pin and valve consisting of a flexible member extending through said pin and a knob on said member above the pin, said connection permitting positioning of said stand pipe in various positions laterally from the vertical plane extending through the axis of said shaft.

5. In a waste control, a stand pipe having a gravitative valve and a valve seat therein, a branch pipe adapted to conduct waste thereto from a tub or the like and operating means for said valve comprising a manually rotatable shaft, an arm carried by said shaft, a pin on said arm extending in substantially the direction of the shaft, and freely rotatable on an axis paralleling that of the shaft, and a flexible extensible connection between said pin and valve consisting of a flexible member extending through said pin and a knob on said member above the pin adjustable longitudinally of said member, said knob having a curved under-surface whereby the same may rock freely on said pin and the connection comprising an elongated member freely bendable to conform to various selected positions of the stand pipe disposed laterally with respect to a vertical plane extending through an axis of said shaft.

6. In a waste control, a stand pipe having a valve and a valve seat therein, a branch pipe adapted to conduct waste thereto from a tub or the like, and brace means for said stand pipe projecting laterally therefrom and including a rod secured to the stand pipe at one end and at its other end slidably engaging a member adapted to be fastened to a pipe, and a single means for clamping said member to the pipe and the rod to the member.

7. In a waste control, a stand pipe having a valve and a valve seat therein, a branch pipe adapted to conduct waste thereto from a tub or the like, and brace means for said stand pipe projecting laterally therefrom and including a rod secured to the stand pipe at one end, and at its other end slidably engaging a yoke member having arms adapted to receive between them a pipe with the rod extending across the space between the arms, and a single means for securing the yoke member in position on the pipe and the rod to the yoke member.

8. In a waste control, a stand pipe having a valve and a valve seat therein, a branch pipe adapted to conduct waste thereto from a tub or the like, and brace means for said stand pipe projecting laterally therefrom and including a rod secured to the stand pipe at one end, and at its other end slidably engaging a yoke member having arms adapted to receive between them a pipe with the rod extending across the space between the arms, and, means for securing the yoke member in position on the pipe and the rod to the yoke member, said yoke member having thereon a plurality of selective positions for said rod spaced longitudinally of the yoke arms.

9. In a waste control, a stand pipe having a valve and a valve seat therein, a branch pipe adapted to conduct waste thereto from a tub or the like, and brace means for said stand pipe projecting laterally therefrom and including a rod secured to the stand pipe at one end, and at its other end slidably engaging a yoke member having two arms adapted to receive between them a pipe with the rod extending across the space between the arms, and a single means for securing the yoke member in position on the pipe and the rod to the yoke member by clamping the rod against the pipe, said yoke member having thereon a plurality of selective positions for said rod spaced longitudinally of the yoke arms.

In testimony whereof we have hereunto set our hands.

PHILIP MUELLER.
LUCIEN W. MUELLER.